April 26, 1932. E. SCHNEIDER 1,855,774
HUMIDITY MEASURING
Filed March 4, 1924
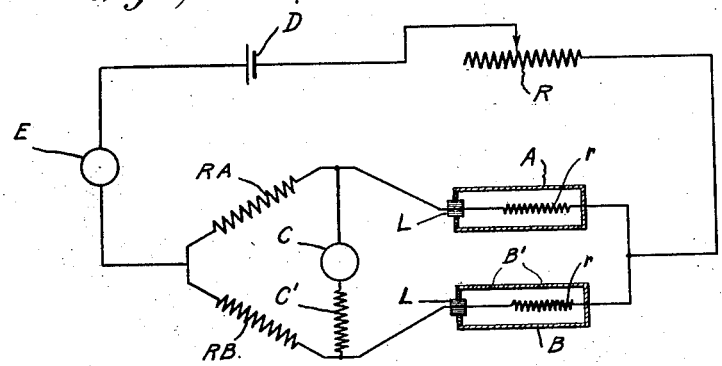
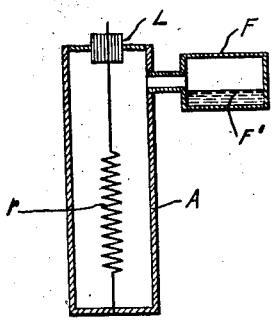
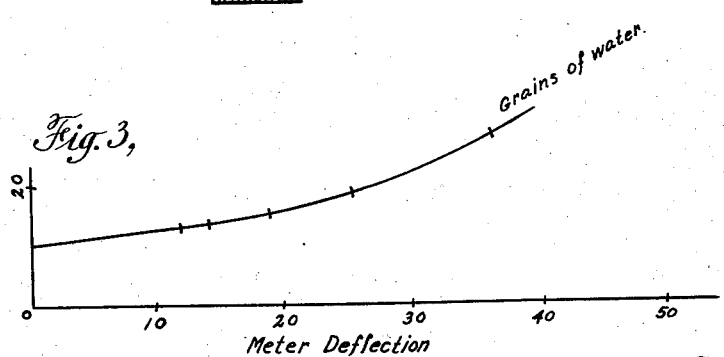
Inventor
Elmer Schneider
By John E. Hubbell
Attorney Patented Apr. 26, 1932

1,855,774

UNITED STATES PATENT OFFICE

ELMER SCHNEIDER, OF PHILADELPHIA, PENNSYLVANIA, ASSIGNOR TO THE BROWN INSTRUMENT COMPANY, A CORPORATION OF PENNSYLVANIA

HUMIDITY MEASURING

Application filed March 4, 1924. Serial No. 696,912.

The primary object of the present invention is to provide a simple and effective method of and apparatus for the direct measurement of atmospheric humidity. Heretofore the humidity or moisture content of air has been measured by indirect methods, the most commonly used method involving a comparison of the readings of so-called dry and wet bulb thermometers with a table or chart showing the relative or absolute humidity which is indicated by any particular dry bulb thermometer reading in conjunction with a corresponding wet bulb reading.

In accordance with the present invention, I measure the humidity of an atmosphere by measuring a physical characteristic or property of that atmosphere which varies in definite relation to the moisture content of the atmosphere. In the preferred practical mode of carrying out my invention, I utilize the principle that the thermal conductivity of an atmosphere composed mainly of air varies in definite relation to the moisture content or humidity of the atmosphere, and compare the thermal conductivity of the atmosphere of which the humidity is to be determined with the thermal conductivity of an atmosphere of determined humidity, i. e., an atmosphere which is entirely dry or which contains a definite moisture content. I effect this comparison by measuring the difference in the resistance of two resistors, each of which varies in resistance with its temperature and each of which is heated by the passage through it of an electric current and one of which is cooled by the atmosphere of which the humidity is to be determined while the other is cooled by a dry atmosphere or by one containing a definite moisture content. One of these resistors is preferably placed in a closed metal walled cell, and the other resistor is placed in a cell which is similar to the one first described, except that it is open to the atmosphere of which the humidity is to be determined. The closed cell may simply be filled with dry air and sealed, but advantageously this cell comprises or is in communication with a humidity determining reservoir which may contain a moisture absorbing substance, as calcium chloride, or may contain a quantity of water and a wick, or the like, whereby the air in the closed cell will always be saturated. The two cells are exposed to the same external temperature, as by arranging them side by side so that they will be subjected to exactly the same external heating or cooling effects. The two resistors are advantageously associated in a Wheatstone bridge circuit with a galvanometer for measuring the relative changes in their resistance.

The various features of novelty which characterize my invention are pointed out with particularity in the claims annexed to and forming part of this specification. For a better understanding of the invention, however, its advantages, and specific objects obtained with it, reference should be had to the accompanying drawings and descriptive matter in which I have illustrated and described forms of apparatus for carrying out the invention.

Of the drawings:

Fig. 1 is a diagrammatic representation of one form of apparatus for carrying out the invention;

Fig. 2 is a sectional elevation of the closed cell with a separate humidity determining reservoir attached thereto; and Fig. 3 is a curve illustrating the relation between humidity and resistance changes.

In the arrangement diagrammatically illustrated in Fig. 1, A and B represent the closed and open cells respectively, which are exactly similar to one another except that the cell A is sealed and the cell B is formed with ports B′ connecting the interior of the cell to the surrounding atmosphere. Each cell contains a resistor $r$ which has one end connected to the metallic wall of the cell and has its other end extending through an insulator L mounted in one end wall of the cell. The two resistors are incorporated in a Wheatstone bridge circuit by connecting the metallic walls of the two cells to one side of a battery or other source of current D, and by connecting the insulated ends of the two resistors $r$ to the other side of the current source D through resistances RA and RB, the resistance RA being in series with the resistor $r$ in the cell A and the resistance RB being in series with the resistor $r$ in the cell B. Ordinarily the current flow through the two resistors will be of the same strength, and in any event, a determined ratio between these current strengths should be maintained. E is an ammeter and R a regulating resistance in series with the source of current D, and C represents the bridge galvanometer, and C' a resistance in series with the galvanometer.

The cell A, as already explained, may be simply filled with dry air and then sealed, or advantageously, it may have associated with it a supplemental reservoir F, as shown in Fig. 2, containing a moisture controlling agent F' which may consist of a calcium chloride, or may consist of water and a wick. In the one case the air in the cell A will be perfectly dry and in the other case it will always be saturated.

In the intended use of the apparatus described, the two cells A and B may be directly exposed to the external atmosphere if the humidity of the latter is to be measured, or may be placed in a drying kiln or moistening chamber when the humidity therein is to be measured, or the cells may be mounted in a casing through which is drawn a sample of the atmosphere of which the humidity is to be measured. For any use, the two cells may advantageously be enclosed in a perforated housing to avoid draft disturbances tending to subject the two cells to different external cooling effects. When the invention is used for industrial purposes, as in connection with a moistening chamber or drying kiln, the galvanometer may have associated with it provisions for controlling a valve regulating the admission of moisture to the kiln or chamber, and signal or alarm provisions such as are associated with pyrometer galvanometers for controlling or giving signal indications of furnace chamber temperatures, and, of course, the galvanometer C may be either a simple indicating instrument or a recording galvanometer.

With the cell A filled with dry air and the cell B filled with air the humidity of which is to be determined and both cells externally exposed to the same temperature and with electric currents of determined strength, the resistance of each resistor $r$ and the potential drop through the resistor will depend upon the thermal conductivity of the atmosphere by which the heat generated by the current flow through the resistor is transmitted to the metal wall of the corresponding cell. The thermal conductivity of air varies with its moisture content in a definite way, so that with any particular moisture content in the air in the cell B, the galvanometer C will give a definite corresponding reading. The relation between the humidity content of the air in the cell B and the deflection of the galvanometer C is not a straight line function, but is of the general character indicated by the diagram shown in Fig. 3, wherein the curve indicates the variation in humidity content corresponding to equal increments in galvanometer needle movement measured along the base line. It will readily be apparent from the foregoing, that the instrument C may, and ordinarily will have its scale calibrated in units of humidity, such as of grains of water per cubic foot.

When the cell A is associated with a moistening reservoir, as shown for example in Fig. 2, the apparatus directly compares the thermal conductivity of the atmosphere of which the humidity is to be measured with the humidity of saturated air. In this case the galvanometer C does not directly measure the humidity of the atmosphere in the cell B, but measures the difference between the actual moisture content of that atmosphere and the moisture content which the atmosphere would have if saturated. In consequence, with the arrangement shown in Fig. 2, the humidity units marked on the scale of the galvanometer C are not units of absolute humidity such as grains of water per cubic foot contained in the atmosphere, but are units of humidity deficiency which may be expressed in percentages or grains of water per cubic foot.

While in accordance with the provisions of the statutes I have illustrated and described the best modes of practicing my invention now known to me, it will be apparent to those skilled in the art that formal variations may be made without departing from the spirit of my invention as set forth in the appended claims.

Having now described my invention, what I claim as new and desire to secure by Letters Patent, is:

1. The method of determining the humidity of an atmosphere which consists in comparing the thermal conductivity of that atmosphere with the thermal conductivity of an atmosphere of determined humidity.

2. The method of determining the humidity of air which consists in comparing the thermal conductivity of that air with the thermal conductivity of moisture saturated air.

3. The method of determining the humidity of air which consists in comparing the thermal conductivity of that air with the thermal conductivity of dry air.

4. The method of determining the humidity of an atmosphere which consists in passing an electric current through two resistors, the resistance of each of which changes with its temperature, subjecting one resistor to the cooling effect of the air of which the humidity is to be measured, subjecting the other resistor to the cooling effect of an atmosphere of determined humidity and measuring the relative change in resistance of the two resistors resulting from the different cooling effects to which they are subjected.

5. Apparatus for measuring the humidity of an atmosphere comprising two resistors, means for passing an electric current through each resistor, means for subjecting one resistor to a cooling effect dependent on the thermal conductivity of said atmosphere, and means for subjecting the other resistor to the cooling effect of an atmosphere of determined humidity, and means for measuring the differences in resistance of said resistors resulting from differences in the cooling effects to which they are subjected.

6. The apparatus of claim 5, further characterized by the provision of two similar cells each enclosing one of the resistors, one of said cells being filled with an atmosphere of determined humidity, while the other cell is open to permit the entrance of the atmosphere of which the humidity is to be determined.

7. The apparatus of claim 5 further characterized by the provision of two similar cells each enclosing one of the resistors and a humidity control reservoir associated with one of said cells while the other cell is open to permit the entrance of the atmosphere of which the humidity is to be determined.

Signed at Philadelphia, in the county of Philadelphia and State of Pennsylvania, this 27th day of February, A. D. 1924.

ELMER SCHNEIDER.